United States Patent
Bell et al.

(10) Patent No.: US 10,379,370 B2
(45) Date of Patent: Aug. 13, 2019

(54) METHOD AND SYSTEM FOR PERFORMING SUB-PIXEL COMPRESSION IN ORDER TO REDUCE MOIRE INTERFERENCE IN A DISPLAY SYSTEM INCLUDING MULTIPLE DISPLAYS

(71) Applicant: PURE DEPTH LIMITED, Panmure, Auckland (NZ)

(72) Inventors: Gareth Paul Bell, Auckland (NZ); Darryl Singh, Auckland (NZ)

(73) Assignee: PURE DEPTH LIMITED (NZ)

( * ) Notice: Subject to any disclaimer, the term of this patent is extended or adjusted under 35 U.S.C. 154(b) by 38 days.

(21) Appl. No.: 15/283,525

(22) Filed: Oct. 3, 2016

(65) Prior Publication Data

US 2017/0097515 A1    Apr. 6, 2017

Related U.S. Application Data

(60) Provisional application No. 62/236,779, filed on Oct. 2, 2015, provisional application No. 62/281,037, filed on Jan. 20, 2016.

(51) Int. Cl.
| | | |
|---|---|---|
| G02B 27/22 | (2018.01) | |
| G02B 27/42 | (2006.01) | |
| G02B 27/46 | (2006.01) | |
| H04N 13/395 | (2018.01) | |
| H04N 13/324 | (2018.01) | |

(52) U.S. Cl.
CPC ......... *G02B 27/4216* (2013.01); *G02B 27/22* (2013.01); *G02B 27/2242* (2013.01); *G02B 27/46* (2013.01); *H04N 13/324* (2018.05); *H04N 13/395* (2018.05)

(58) Field of Classification Search
CPC ............... G02B 27/4216; G02B 27/22; G02B 27/2242; G02B 5/1828; G02B 27/2221; G02B 27/26; G02B 27/225; G02B 27/46; G06T 3/4007; H04N 13/359; H04N 13/395; H04N 13/324
See application file for complete search history.

(56) References Cited

U.S. PATENT DOCUMENTS

| | | |
|---|---|---|
| 6,219,015 B1 | 4/2001 | Bloom et al. |
| 6,909,556 B2 | 6/2005 | Berman et al. |
| 7,347,558 B2 | 3/2008 | Berman |
| 8,177,408 B1 | 5/2012 | Coleman |
| 2002/0176037 A1 | 11/2002 | Li |
| 2004/0183972 A1 | 9/2004 | Bell |

(Continued)

FOREIGN PATENT DOCUMENTS

EP    1 983 363    10/2008

OTHER PUBLICATIONS

U.S. Appl. No. 15/283,621, filed Oct. 3, 2016; Bell et al.

(Continued)

*Primary Examiner* — Richard J Hong
(74) *Attorney, Agent, or Firm* — Craig A. Baldwin

(57) ABSTRACT

A multi-display system (e.g., a display including multiple display panels) includes at least first and second displays (e.g., display panels or display layers) arranged substantially parallel to each other in order to display three-dimensional (3D) features to a viewer(s). At least sub-pixel compression is utilized in order to reduce moiré interference.

17 Claims, 19 Drawing Sheets
(13 of 19 Drawing Sheet(s) Filed in Color)

(56) References Cited

U.S. PATENT DOCUMENTS

| | | |
|---|---|---|
| 2004/0213449 A1 | 10/2004 | Safaee-Rad et al. |
| 2005/0088385 A1 | 4/2005 | Elliott et al. |
| 2006/0103951 A1 | 5/2006 | Bell et al. |
| 2006/0203338 A1 | 9/2006 | Pezzaniti |
| 2006/0290594 A1 | 12/2006 | Engel et al. |
| 2007/0064020 A1 | 3/2007 | Credelle et al. |
| 2007/0086090 A1* | 4/2007 | Wang .................. G02B 27/225 359/464 |
| 2008/0117231 A1 | 5/2008 | Kimpe |
| 2008/0204873 A1* | 8/2008 | Daniell ................ H04N 13/359 359/463 |
| 2011/0188134 A1 | 8/2011 | Bell et al. |
| 2011/0249026 A1 | 10/2011 | Singh |
| 2013/0176725 A1 | 7/2013 | Hajjar et al. |
| 2014/0211128 A1 | 7/2014 | Yang et al. |
| 2014/0240626 A1* | 8/2014 | Ericson .......................... 349/15 |
| 2015/0323805 A1 | 11/2015 | Bell |
| 2016/0012630 A1 | 1/2016 | Bell |

OTHER PUBLICATIONS

U.S. Appl. No. 15/281,381, filed Sep. 30, 2016 Bell et al.
Sales et al., "LED Illumination Control and Color Mixing with Engineered Diffusers", Proceedings of SPIE, vol. 5530, Oct. 20, 2004; pp. 133-140.

\* cited by examiner

Desired phase-grating structures for different wavelengths λ. Only three grating periods are shown here.

Variable overphasing of the phase structure of Fig. 1(a). Only one grating period is shown. It is $\lambda_b = \lambda_1$.

METHOD AND SYSTEM FOR PERFORMING SUB-PIXEL COMPRESSION IN ORDER TO REDUCE MOIRE INTERFERENCE IN A DISPLAY SYSTEM INCLUDING MULTIPLE DISPLAYS

This application is related to and claims priority on each of provisional U.S. Patent Application Nos. 62/281,037, filed Jan. 20, 2016; and 62/236,779, filed Oct. 2, 2015, all of which are hereby incorporated herein by reference in their entireties.

FIELD OF THE INVENTION

This invention relates to a multi-display system (e.g., a display including multiple display panels/display layers), where at least first and second displays (e.g., display panels or display layers) are arranged substantially parallel to each other in order to display three-dimensional (3D) features to a viewer(s). Thus, this invention relates generally to displays and, more particularly, to display systems and methods for displaying three-dimensional features.

BACKGROUND AND SUMMARY OF THE INVENTION

Traditionally, displays present information in two dimensions. Images displayed by such displays are planar images that lack depth information. Because people observe the world in three-dimensions, there have been efforts to provide displays that can display objects in three-dimensions. For example, stereo displays convey depth information by displaying offset images that are displayed separately to the left and right eye. When an observer views these planar images they are combined in the brain to give a perception of depth. However, such systems are complex and require increased resolution and processor computation power to provide a realistic perception of the displayed objects.

Multi-component displays including multiple display screens in a stacked arrangement have been developed to display real depth. Each display screen may display its own image to provide visual depth due to the physical displacement of the display screens. For example, multi-display systems are disclosed in U.S. Patent Publication Nos. 2015/0323805 and 2016/0012630, the disclosures of which are both hereby incorporated herein by reference.

When first and second displays or display layers are conventionally stacked on each other in a multi-display system, moire interference occurs. The moire interference is caused by interactions between the color filters within the layers when projected onto a viewer's retina. For example, when green color filters overlap, light is transmitted making for a comparative bright patch. When a green filter is over say a red filter, not as much light will be transmitted making for a dark region. Since the rear and front displays or display layers have slightly different sizes when projected onto the retina, the pixels will slowly change from being in phase to out of phase. This has the effect of producing dark and bright bands otherwise known as moire interference.

There have been several approaches attempting to remove moire interference in a multi-layer display (MLD) system. Certain MLD systems solely utilize diffusive optics to blur the rear-most display layer. This approach suffers from the following limitations: (a) the rear most image is inherently blurry—there is a trade-off between reducing moire interference and the clarity of the rear most image display layer; (b) the diffusing element utilizes a specialized diffuser pattern, which is difficult to obtain; and (c) the diffusing element sits between polarizers and both the film substrate and stiffener substrate must be free of any birefringence. As a result, MLD systems using solely a diffuser to address moire issues do not provide an ideal solution to reducing moire interference, especially when those systems have reduced form factors. Historic and present methodologies that rely only on diffusers to address moire interference do not provide an acceptable solution to the moiré issue without the introduction of significant and detrimental side-effects to image quality.

Certain example embodiments of the instant invention provide solution(s) that make moiré interference in MLD systems vanish or substantially vanish, but without significantly sacrificing the rear display resolution and contrast. In certain example embodiments of this invention, the MLD system includes first and second displays. Sub-pixel compression is utilized in order to reduce or eliminate moire interference. For example, when the rear display of a MLD system has red (R), green (G), and blue (B) color filter aligned in respective columns (or rows), physical sub-pixel compression remaps the R, G and B sub-pixels based on their color into a single combined stripe (in the column or row direction) which may be white (W). It is possible to use the method of sub-pixel compression to construct a multi-layer optical element that turns or compresses the red and blue sub-pixels onto the green sub-pixel (e.g., via a diffraction based grating, prism(s), and/or splitting device(s)), thereby forming a white line. This changes the rear display's RGB color filter pattern of a given subpixel or pixel area into a single white stripe or area, which removes color filter interaction between display layers and can reduce moire interference. The white stripe or area may then be copied to the left and/or right in order to expand it out again (e.g., via a kernel such as a refractive beam mapper (RBM) which may be square shaped for instance) as it proceeds toward the front display of the MLD system.

In certain example embodiments of this invention, there is provided a display device comprising: a first display in a first plane for displaying a first image; a second display in a second plane for displaying a second image, wherein said first and second planes are approximately parallel to each other; a subpixel compressing structure provided between the first and second displays for reducing moire interference, the subpixel compressing structure comprising a first optical element for compressing red light from a red subpixel, green light from a green subpixel, and blue light from a blue subpixel into a white area, and a second optical element for spreading the white area.

Sub-pixel compression may or may not be used in combination with other techniques for reducing moire interference (e.g., color filter offset or dissimilar color filter patterns on the respective displays, diffuser techniques, and/or refractive element techniques) in various embodiments of this invention.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

These and other features and advantages may be better and more completely understood by reference to the following detailed description of exemplary illustrative embodiments in conjunction with the drawings, of which.

DETAILED DESCRIPTION

This invention relates to a multi-display system (e.g., a display including multiple display panels), where at least first and second displays (e.g., display panels or display layers) are arranged substantially parallel to each other in order to display three-dimensional (3D) features to a viewer(s). The displays may be flat or curved in different embodiments. Thus, embodiments of this invention relate generally to displays and, more particularly, to display systems and methods for displaying three-dimensional features. MLDs according to example embodiments of this invention may be used, for example, as displays in vehicle dashes in order to provide 3D images (e.g., for speedometers, vehicle gauges, vehicle navigation displays, etc.).

The color moiré interference problem is caused by the pattern regularity of both liquid crystal display (LCD) color filter arrays as, for example, RGB pixels are aligned into RGB columns in both displays of a MLD system. Color moiré interference may be largely prevalent in the horizontal direction.

Figure 1:
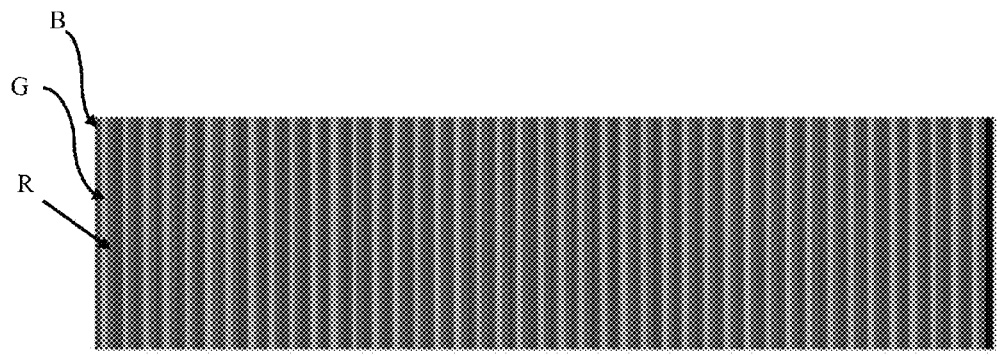
FIG. 1 is a top plan view of color filters of a liquid crystal display (LCD) where pixels are the same color in each column (or row)
Figure 2:
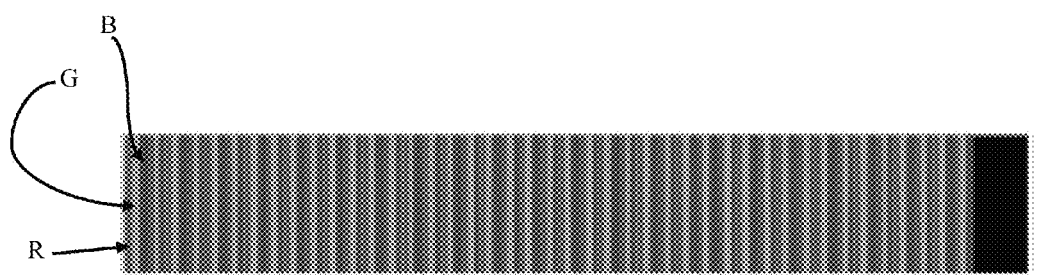
FIG. 2 is a top plan view of color filters of another liquid crystal display (LCD) where pixels are the same color in each column (or row)
Figure 3:
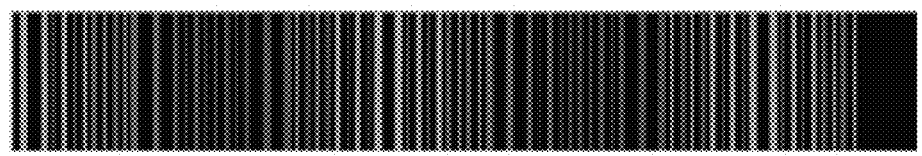
FIG. 3 is a top plan view of a MLD system resulting from the combination of LCDs of FIGS. 1 and 2 where the LCD of FIGS. 1 and 2 are overlapped with each other in a stacked relationship, which results in moire interference.

FIGS. 1-3 illustrate an arrangement in a MLD system which experiences moire interference. FIG. 1 is a top plan view of color filters/pixels of a first liquid crystal display (LCD) where pixels or subpixels are the same color in each column. In particular, FIG. 1 shows a LCD having a conventional red-green-blue (R-G-B) repeating pattern or arrangement, wherein the pixels or subpixels are the same color in each column. Starting from the left side of FIG. 1, the color filter stripes are arranged in vertical lines in a BGR order, and this BGR order repeats itself over and over moving from left to right across the display of FIG. 1. Thus, the pattern in the display or display layer of FIG. 1 includes blue columns, green columns, and red columns. The green (G) columns are located between blue (B) and red (R) colored columns. A subpixel may be considered the area of a given pixel electrode in an area of a particular color filter. For instance, R, G and B subpixels may make up a pixel. Alternatively, a subpixel may be considered to be a pixel. FIG. 1 is shown without color mask rotation. Conventionally, both panels of a multiple layered display (MLD) may be configured similarly with such a R-G-B arrangement. The repeatable pattern may be R-G-B, or R-B-G, or any other combination.

Likewise, FIG. 2 is a top plan view of color filters/pixels/subpixels of a second LCD where pixels or subpixels are also the same color in each column. Starting from the left side of FIG. 2, the color filter stripes are arranged in vertical lines in a RGB order, and this order repeats itself over and over moving from left to right across FIG. 2. The repeatable pattern may be R-G-B, or R-B-G, or any other combination involving these colors. As shown in FIG. 2, like in FIG. 1, green (G) columns are located between blue (B) and red (R) colored columns.

FIG. 3 is a top plan view of a MLD system resulting from the combination of the LCDs of FIGS. 1 and 2, one on top of the other in a stacked overlapping relationship in a MLD system. FIG. 3 shows the mixing of the color filter and pixel/subpixel patterns shown in FIGS. 1 and 2. In particular, FIG. 3 illustrates the emergence of moiré interference given an instance where both LCDs have a similar R-G-B column arrangement, where the pixels are the same color in each column. For example, when the FIG. 2 pattern overlaps the FIG. 1 pattern in a MLD system, green color filter lines overlap (e.g., see the left portion of FIG. 3), and light in this green filter line overlap area is transmitted through the MLD system making for a comparatively bright green patch. When a green filter overlaps a red filter for instance (or a blue filter is over a red filter), not as much light will be transmitted making for a dark region (e.g., see the dark regions surrounding the green stripe at the left side of FIG. 3). Since the rear and front displays or display layers have slightly different sizes when projected onto a retina, the pixels will slowly change from being in phase to out of phase. This has the effect of producing dark and bright bands otherwise known as moire interference.

Embodiments of this invention address, and reduce or solve, this moire interference problem. Certain example embodiments of the instant invention provide solution(s) that make moiré interference in MLD systems vanish or substantially vanish, but without significantly sacrificing the rear display resolution and contrast. In certain example embodiments of this invention, the MLD system includes at least first and second displays that are provided in a stacked relationship so as to be located on different respective planes that are parallel or substantially parallel to each other (e.g., see FIGS. 5-7 and 21). Sub-pixel compression is utilized in certain embodiments of this invention in order to reduce moire interference (e.g., see FIGS. 7 and 21). For example, when the rear display of a MLD system has red (R), green (G), and blue (B) color filters aligned in respective columns (or rows) as shown in FIG. 1 or 2, physical sub-pixel compression remaps the R, G and B sub-pixels of a given pixel(s) based on their color into a combined white (W) stripe (in the column or row direction) as shown in FIGS. 7, 19, 21 and 24. It is possible to use the method of sub-pixel compression to construct a multilayer optical element that turns or compresses the red and blue sub-pixels onto the green sub-pixel (e.g., via a diffraction based grating, prism(s), and/or splitting device(s)), thereby forming a white line emerging from the rear display of the MLD system as shown in FIGS. 7, 19, 21 and 24. This changes the rear display's RGB color filter pattern of a given subpixel or pixel into a single white stripe or area, which removes color filter interaction between display layers and displays and can reduce moire interference. The white stripe or area may then, as shown in FIGS. 7, 20, 21 and 25 for example, be copied to the left and/or right in order to expand it out again (e.g., via a kernel such as a refractive beam mapper (RBM) which may be square shaped for instance) as it proceeds toward the front display of the MLD system. It is noted that, of course, this invention is not limited to RGB systems, and that other colors of color filters and sub-pixels such as yellow, white, or cyan may also or instead be used. The subpixel compression shown in FIGS. 7 and 19-25 relates to embodiments where moiré interference will be comparatively reduced or disappear (compared to FIG. 3), and where the color of the MLD system will be approximately white (e.g., gray) when seen from a distance when desired (e.g., in the on state for a normal black (NB) type display system).

In certain sub-pixel compression embodiments, a multi-layer optical element (e.g., prism or RBM) turns or compresses the red and blue sub-pixels onto the adjacent green sub-pixel to reduce/eliminate moiré interference (e.g., see FIGS. 7 and 19-25). This changes the rear color filter pattern into a single white strip for a given pixel area, which removes color filter interaction between display layers. Again, this technique may be used in combination with any other embodiment of this invention described herein. A refractive beam mapper (RBM) can be combined with this color compressor for expanding the white stripes as the light proceeds toward the viewer. The combination of compression and expansion in the compression embodiments effectively removes color structure from the rear LCD without reducing resolution.

Figure 6:
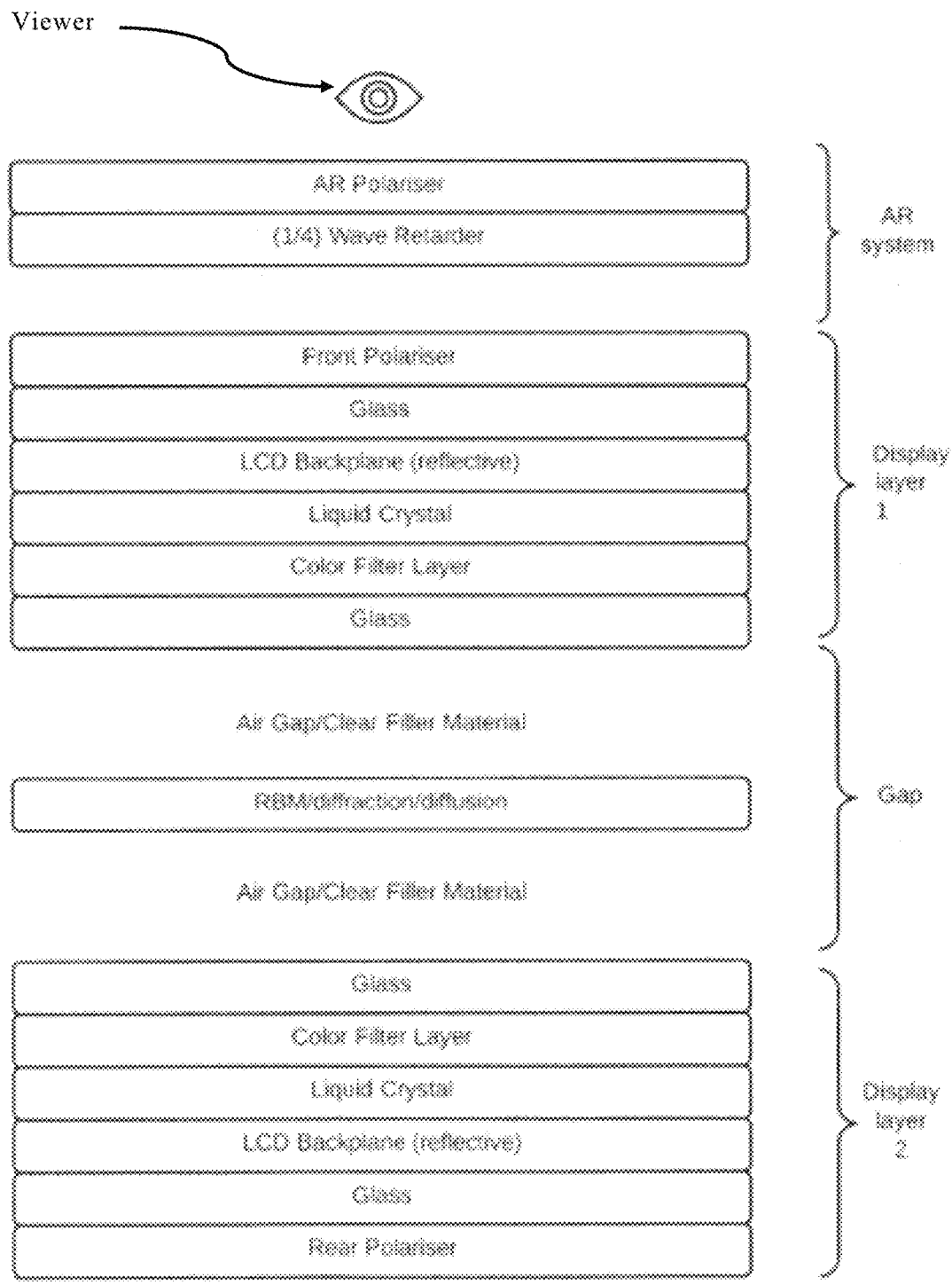
FIG. 6 is a schematic side cross sectional view of a MLD according to an example embodiment of this invention, which may be used with the embodiments of any of the figures herein.

Sub-pixel compression (e.g., see FIGS. 7 and 19-25) may or may not be used in combination with other techniques for reducing moire interference (e.g., color filter offset or dissimilar color filter patterns on the respective displays, diffuser techniques, front and rear displays flipped relative to each other as shown in FIG. 6, and/or refractive element techniques) in various embodiments of this invention. For example, the sub-pixel compression techniques described and/or illustrated herein may optionally be used in combination with any of the color filter offset (different color filter patterns in the respective displays) techniques described in U.S. Ser. No. 15/281,381 filed Sep. 30, 2016, the disclosure of which is hereby incorporated herein by reference. In the color offset technique, for example, color filters of the first display are offset and/or differently arranged compared to color filters of the second display, as viewed from the point of view of the viewer, in order to reduce or eliminate moire interference. Thus, according to embodiments of the present disclosure, systems and methods are described providing for the elimination and/or reduction of moiré interference in a multiple layered display through sub-pixel compression which may or may not be used in combination with other technique(s) such as diffuser techniques, refractive element (e.g., RBM) techniques, color filter/area dithering or other color filter/area dissimilarities.

In certain embodiments of this invention, a beam mapping element such as diffractive optical element (DOE) or a refractive beam mapper (RBM) composed of many microlenses may be used to either compress color light from respective subpixels as part of a subpixel compression technique, to reduce moire interference on its own, and/or to copy or expand white light in a subpixel compression technique after it had been compressed into a white line or stripe (e.g., see FIGS. 5-17). When an RBM is used on its own, not in conjunction with subpixel compression techniques, pseudo random mapping may be provided in order to not introduce extra moiré effects (e.g., see FIGS. 4-6 and 15-17). The divergence of individual beams may be limited so that any point on the rear LCD is not diverted more than one pixel distance from a straight line in certain example embodiments. One may also laminate such a beam mapping element to the front display and optically match the media between the two LCDs with a non-birefringent material in certain example embodiments, and such embodiments may or may not be used in combination with subpixel compression techniques discussed herein (e.g., see FIGS. 5, 6, 15 and 17).

Displays or display layers herein (e.g., see front display 1 and rear display 2 in FIG. 6, or the corresponding displays in FIGS. 4, 5, 7, 15-17, and 21) may be LCDs, OLEDs, or the like. Twisted nematic (TN) LCDs may follow a fairly generic pixel layout, such as a square divided into three portions running horizontally (or vertically) with red green and blue sub-pixels. The sub-pixels may be separated by a black mask in the horizontal and vertical directions. There is often a square protrusion in the corner of the sub-pixel to cover the drive transistor. There are several different types of pixel technology that enable wide screen viewing and temporal performance required for modern desktop monitors and televisions. Embodiments of the present invention are compatible with all of these LCDs, since the backplanes are designed to follow the basic RGB stripe pixel layout. As such, the backplane layout required for each pixel not need to change. For example, pixel type displays by manufacturer include: Panasonic (IPS Pro), LG Display (H-IPS & P-IPS), Hannstar (S-IPS), AU Optronics (A-MVA), Samsung (AFFS), S-LCD (S-PVA), and Sharp Corporation (ASV and MVA). In certain embodiments, both displays or display layers may be OLEDs, or one display may be an OLED and the other an LCD. Note that in OLEDs, respective sub-pixels or pixels would be filled with red, green, and blue material as the color filter material (as opposed to having LCD type color filters).

FIG. 6 illustrates a MLD according to an example embodiment of this invention, in which the stacked overlapping layers/displays of any of the figures herein may be provided and utilized. For example, the displays shown in any of FIG. 4-5, 7, 15-17, or 21 may be the front 1 and rear 2 displays in FIG. 6, respectively. The first display or display layer of the MLD may be element 1 (or 2), and the second display or display layer of the MLD may be element 2 (or 1). Display or display layer 2 is closest to the backlight of the MLD, and it may be desirable to have its backplane facing the backlight system to recycle light that may pass through row drivers, column drivers, transistors, and storage capacitance lines into the backlight. A two polarizer configuration may be used, as shown in the figure, and gaps may be designed to include air or material having birefringence designed to maintain black state of the display when desired. The gap may include material having a refractive index matched closely to glass or the layers on either side to reduce internal reflection and/or depolarization effects. For the front display or display layer 1, its backplane may be oriented opposite to that of display or display layer 2. In particular, for the front display 1 its backplane may be oriented to face the viewer to reduce internal reflections. Thus, it can be seen in FIG. 6 that the color filter layers (each of which may be made up of one or more layers) of the respective displays 1 and 2 may be designed to face each other, with no liquid crystal layer from either display being located between the color filter layers of the first and second displays in certain example embodiments. In certain example embodiments, to reduce external reflections of ambient light, there may be provided an antireflective system at the front such as that shown in FIG. 6 made up of quarter wave retarder and an antireflective polarizer, so that ambient light that would normally be reflected would undergo a quarter wave rotation on the first pass through the AR polarizer, is reflected by the backplane elements, undergoes a second rotation through the quarter wavelength retarder. By the time it goes through this second rotation, it is substantially orthogonal to the transmission axis of the AR polarizer and thus will be substantially absorbed. Additionally, black mask (BM) or other non-reflective material may be added behind the conductive traces of the displays to reduce reflections. Additionally, antireflective (AR) coating(s) may be applied to the interior surfaces in certain example embodiments of this invention. The AR coating may, for example, operate in the visible range, e.g., moth eye, single layer interference, multi-layer interference, etc.

Figure 4:
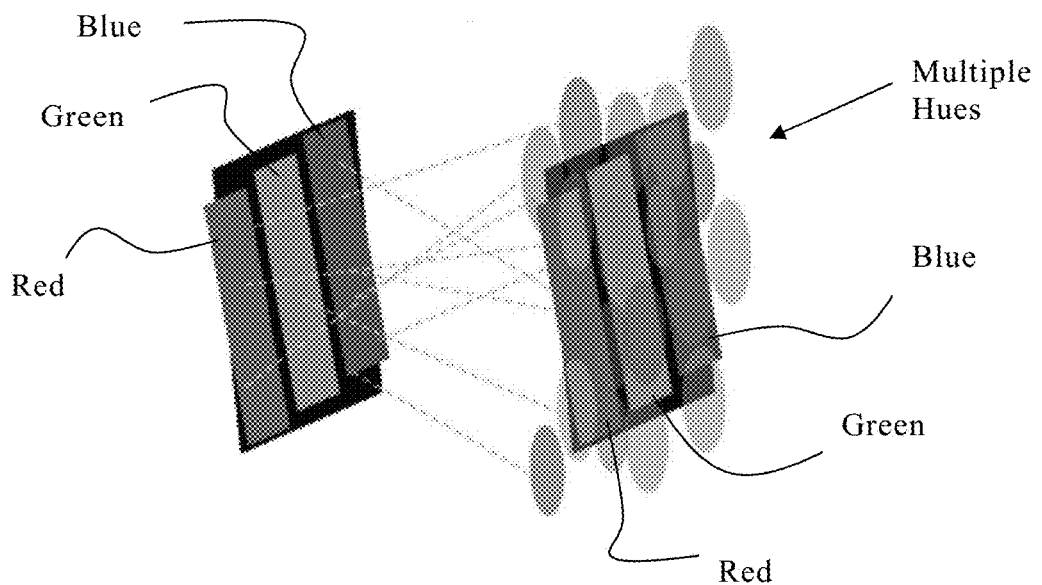
FIG. 4 is a schematic diagram illustrating pseudo random mapping of pixels of a rear display to pixels in a front display of a MLD system.
Figure 5:
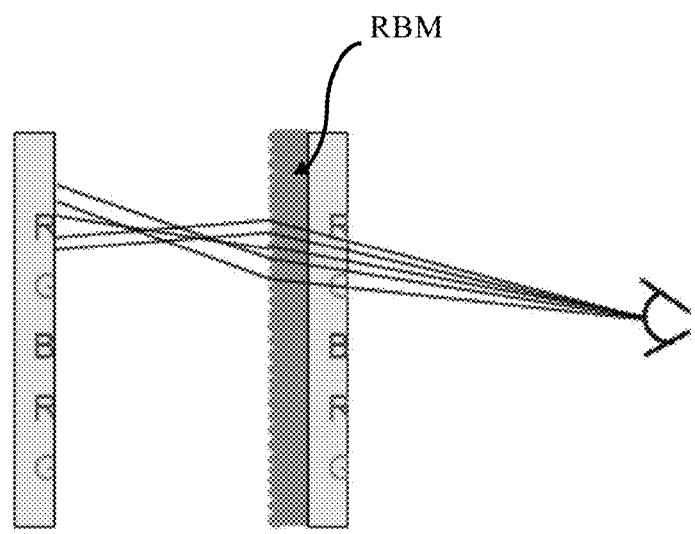
FIG. 5 is a schematic diagram illustrating a mapping element that may be used in connection with the pseudo random mapping of FIG. 4 in order to reduce moire interference (this may or may not be used in combination with sub-pixel compression embodiments in various embodiments of this invention)

Regarding a refractive beam mapper (RBM), such a beam mapping element is made up of, or includes, a plurality of micro-lenses and may be used as a stand-alone element for reducing moire interference via pseudo random mapping (e.g., see FIGS. 4-6 and 15-17), or as part of a subpixel compression embodiment (e.g., see FIGS. 6-7, 16, and 19-30), in various embodiments of this invention. In certain example pseudo random mapping embodiments (e.g., FIGS. 4-5), each of the refractive micro-lenses of an RBM may be designed to direct incident rays from the back LCD 2 to an observer in a defined path, each ray passing through a different subpixel in the front LCD 1 according to a pseudo random mapping. For example, FIG. 4 shows the pseudo random mapping of rear pixels of rear display 2 to pixels in the front display 1 (the rear display is the left-most display in FIG. 4). The pseudo random mapping is used in order to not introduce extra moiré effects, and can reduce moire interference. In an example embodiment, the divergence of these individual beams is limited so that light from any pixel or subpixel of the rear LCD is not diverted more than one pixel or subpixel distance from a straight line on the front display. Optionally, the RBM may be laminated to the top LCD 1 (see FIGS. 5, 15 and 17), and optionally matched or substantially matched optically to media between the two LCDs with a non-birefringent material. However, in other embodiments, the refractive beam mapper can be placed anywhere within the LCD stack. FIG. 5 for instance shows the beam mapping element (e.g., RBM including a microlens array) located between the front and rear LCDs and laminated to an interior side of the front display.

In certain example embodiments, the micro-lenses of an RBM may be fabricated using gray-scale lithography, to produce arbitrary surface structures in a micro-lens format. Each lens element may configured for directing light in a controlled direction enabling arbitrary and asymmetric scattering angles as shown in FIGS. 4-5. It is possible to make a master to replicate the RBM using a variety of high-volume manufacturing processes and materials as in the replication of micro-lens features, profile slope angle is more important than profile height. FIGS. 4-5 show how the refractive beam mapper superimposes rays from the back LCD 2 onto the front LCD 1 from an observer's point of view. The beam paths are mapped in a pseudo random fashion so not to introduce other artifacts such as extra moiré. The underlying LCD structure 2 is randomized and thus incapable of generating significant moiré interference with the top LCD 1.

Alternatively, a diffuser may instead be used for the construction of a moiré suppression element. While the process can be adapted to make a refractive beam mapper, engineered diffusers can also be used as optimal diffuser elements for more reduction.

The refractive beam mapper may exhibit various features. For example, an RBM may exhibit achromatic performance. In addition, an RBM may exhibit arbitrary/asymmetric scattering angles. Further, an RBM may exhibit controlled intensity distribution patterns (e.g., circular, square, rectangular, elliptical, line, ring, etc.). Also, an RBM may exhibit controlled intensity profiles (e.g., flat top, Gaussian, batwing, custom, etc.). An RBM may also exhibit high optical transmission efficiency (e.g., 90 percent). Additionally, an RBM may exhibit the preservation of polarization. An RBM may be of or include various materials, such as polymer injection molding, hot embossed polymers, polymer-on-glass components, etc.

Moiré interference in MLD is commonly suppressed by adding a diffuser element between the back LCD and the observer so that the pixel structure in the back LCD is blurred. The greater the diffuser spread the less the moiré but correspondingly the observed resolution of the back LCD is reduced. This becomes an optimization problem and can be described as an image quality cost function IQC which can range from 0 to 4, 0 being perfect and 4 being worst for both moiré and blurring. Factors to consider include contrast=(max−min)/(max+min) where (1 is best, 0 is worst); crosstalk=1−contrast of alternating black and white lines (range 0:1); moiré=contrast of moiré for constant white pattern on both LCD's (range 0:1); IQC=moiré_X+moiré_Y+crosstalk_X+crosstalk_Y (i.e. range is 0:4), the lower this value, the better. Normally the cost function would have a realistic maximum of approximately 2 as shown by the following limits: no diffuser:moire_X+moire_Y=2, crosstalk_X+crosstalk_Y=0; and strong diffuser:moire_X+moire_Y=0, crosstalk_X+crosstalk_Y=2.

Figure 8:
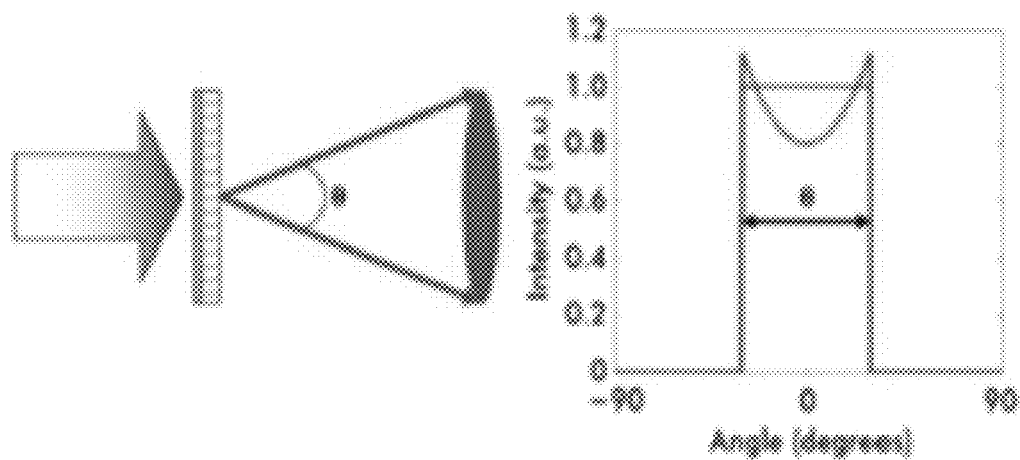
FIG. 8 illustrates a bandwidth limited implementation of a RBM having refractive optics.
Figure 9:
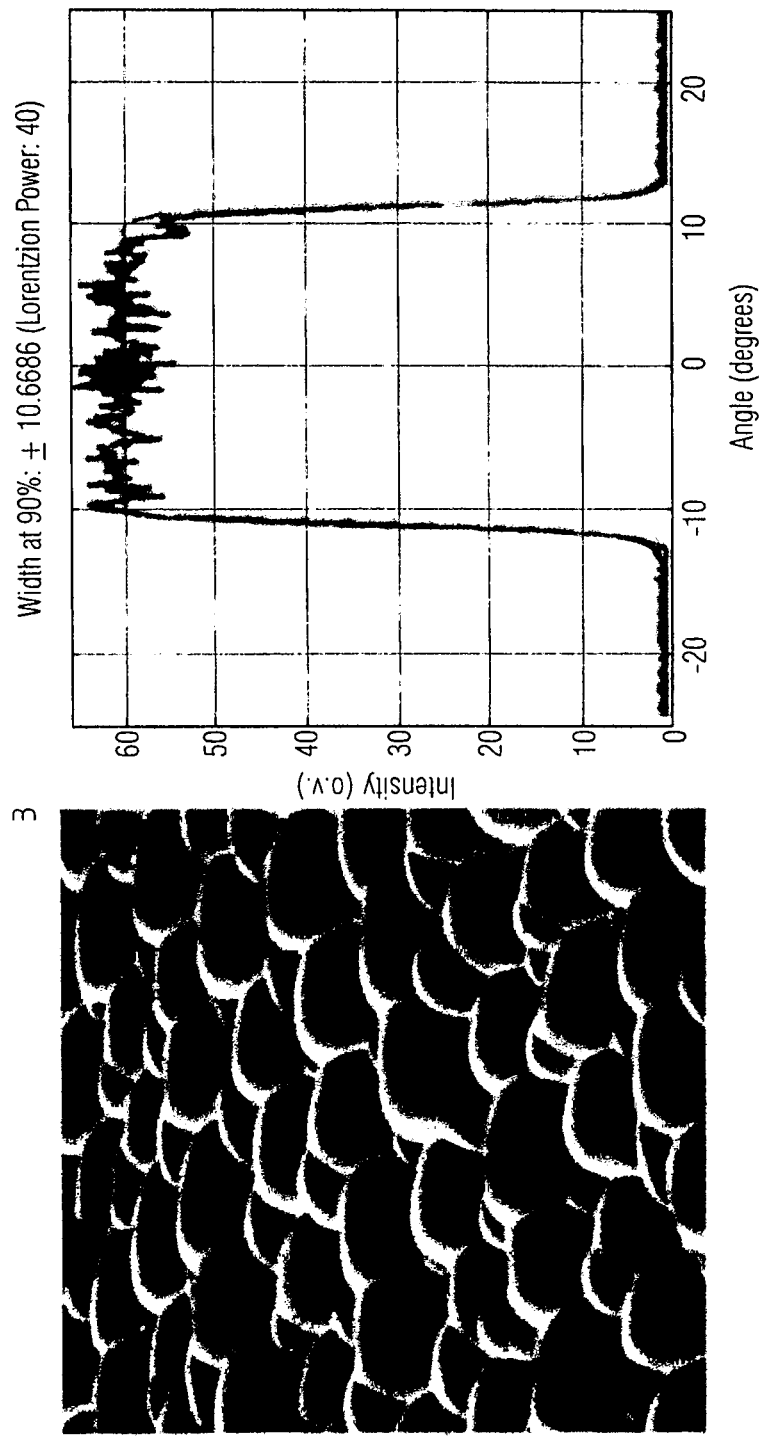
FIG. 9 is an intensity profile exhibiting improved super-Lorentzian characteristics over a range of angles with p=40 and lens feature sizes less than or equal to 160 microns.

FIG. 8 illustrates a bandwidth limited implementation of an RBM having custom refractive optics which are close to a flat top profile, such that the far field pattern is as close as possible to a flat top profile. The prescription for the set of lenses that comprise the distribution is defined, including feature sizes and slope angles based on the scatter requirements. These parameters may be defined in terms of probability distribution functions that specify the likelihood that a certain lens will assume a specific prescription. A spatial distribution of the microlenses to create the surface structure is designed to create the surface structure according to a desired distribution function. It is appreciated that any underlying periodicity in the spatial distribution of the microlenses may be eliminated in certain example embodiments. Also, lens mismatches may be eliminated, wherein lens mismatches can lead to wide-angle scatter, are eliminated. Both of these improvements maximize the use of available light. FIG. 9 shows an intensity profile exhibiting a much improved super-Lorentzian behavior over the entire range of angles with p=40, and lens feature sizes ≤160 µm. The careful pseudo randomization of the surface structure also creates a scatter distribution that is devoid of artifacts and induced moiré. This may be significant as regular patterns can introduce additional moiré interference.

Figure 10:
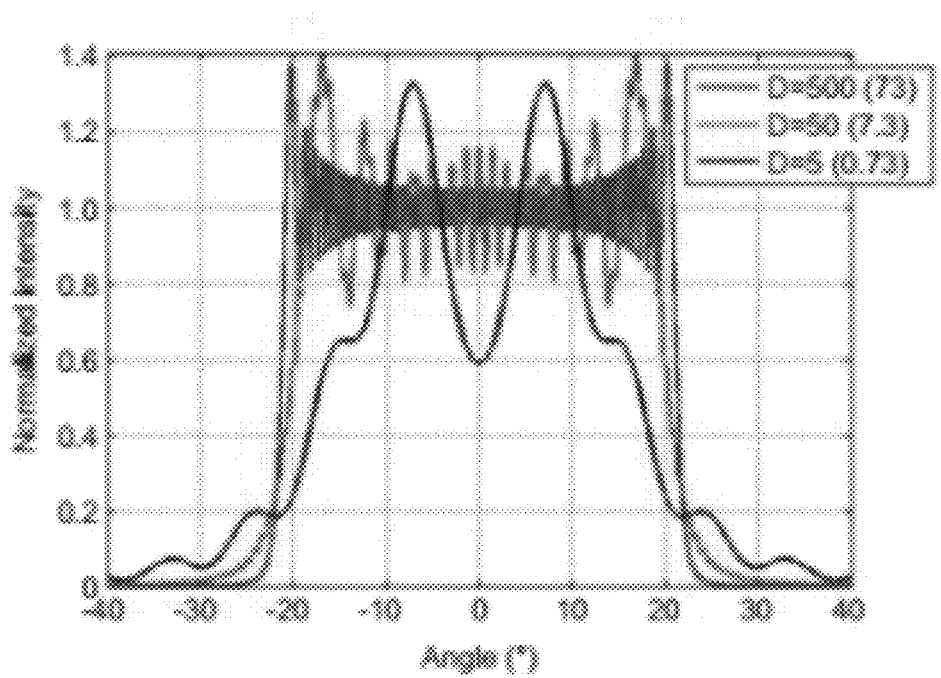
FIG. 10 is a graph illustrating that bigger microlenses will typically have better anti-moiré diffuser profiles.

FIG. 10 shows that there is a tradeoff between microlens size and introduced image artifacts. Bigger microlenses will typically have better anti-moiré diffuser profiles. If the microlenses become of a size that are visible to the naked eye, then extra image artifacts will become apparent. These include sparkle, pixel walking and more interference between the pattern and either or both LCDs. FIG. 10 illustrates PSF for a single microlens for various values of diameters. Minimizing feature size may also be utilized in the design of an LCD moiré reduction element. The feature size should ideally be smaller than a sub pixel in order to remain substantially invisible to the naked eye as shown in FIG. 4. In the case where scatter centers take the form of microlenses, the feature size is given by the microlens diameter. In particular, miniature refractive elements are desired. If the microlenses become of a size that are visible to the naked eye then extra image artifacts will become apparent. These include sparkle, pixel walking, and moiré interference between the pattern and either or both LCDs. Sparkle is most often seen in anti-glare displays where the display surface has been treated to produce a matte textured surface. These surface features act as refractive or diffractive elements and can either focus or defocus individual pixel elements depending on the viewer position leading to intensity variations or sparkle. Pixel walking is the result of the refractive distortion appearing to move and distort the individual pixels and the viewer moves position. Extra moiré interference is introduced when regular features in the array of microlens "beat" with one or both of the LCDs. Randomization and reduction of lens size in an RBM or diffuser and placement reduce these extra moiré artifacts. There are two factors to consider in this regard, sag and averaging. To ensure the best uniformity and reduction in moiré, a large number of scatter centers should be illuminated within each pixel area as shown in FIG. 4. At the same time, for a certain set of parameters (e.g., spread angle, index of refraction, and conic constant), the lens depth decreases as the microlens diameter decreases. If the process continues, a diffractive regime is eventually reached where the lens depth only imparts a phase delay that is a small fraction of $2\pi$. In this respect, it is useful to define the phase number in the following equation:

$$M = \frac{y_{max}}{(\lambda/\Delta n)},$$

In the above equation, ymax represents the total lens sag, $\lambda$ is the wavelength under consideration, and $\Delta$ n equals n($\lambda$)1, with n the index of refraction at wavelength $\lambda$, for an element in air. The phase number basically expresses the total sag in the language of phase cycles and defines the regime, diffractive or refractive, the microlens operates on: M=1 implies a diffractive element with exactly $2\pi$ phase shift. In one embodiment, for a microlens to operate in the refractive regime, as is desirable for an achromatic component with high target efficiency, the phase number M should be as large as possible.

Consider again the case of a microlens that scatters a collimated beam with a 40° spread. As the diameter gets smaller the farfield scatter shows coarser oscillations and more sloped falloff, translating into lower target efficiency. A simple rule of thumb to help decide the minimum feature size or lens diameter to utilize is given by the following equation.

$$D \geq 230M\frac{\lambda}{\theta_0},$$

In the above equation, $\theta_0$ is the halfwidth beam spread angle in degrees (in air). To be well within the refractive regime, M should be around 8 or more. Assuming $\theta=2°$ and $\lambda=0.633$ μm, and M=8, a result for D≥582 μm is obtained, which is too large compared with a 200 um pixel and will be very visible, degrading the image. Increasing the spread to 20 degree will reduce D by a factor of 10 to 58 μm. In the above equation, the closer the diffuser is to the back panel, the greater the FWHM angle $\theta_0$. The equation also gives a rule of thumb of microlens diameter to $\theta_0$.

Embedding the refractor in a medium of higher refractive index (RI) such as silicon OCA, rather than air, allows for the effective use of a wider angle refractor, as the higher RI will reduce the refractive power of each microlens. With an RI=1.42, $\theta_0$ equates to an angle of $\theta=\sim11°$ or by the above referenced equation, D≥105 μm which is more acceptable. In one embodiment, embedding in high RI material effectively reduces the microlens diameter, which results in less image artifacts. Specifically, replacing the air between the two panels with an indexed matched medium will also allow smaller divergence angles as measured in air and thus smaller microlens diameters.

Figure 11:
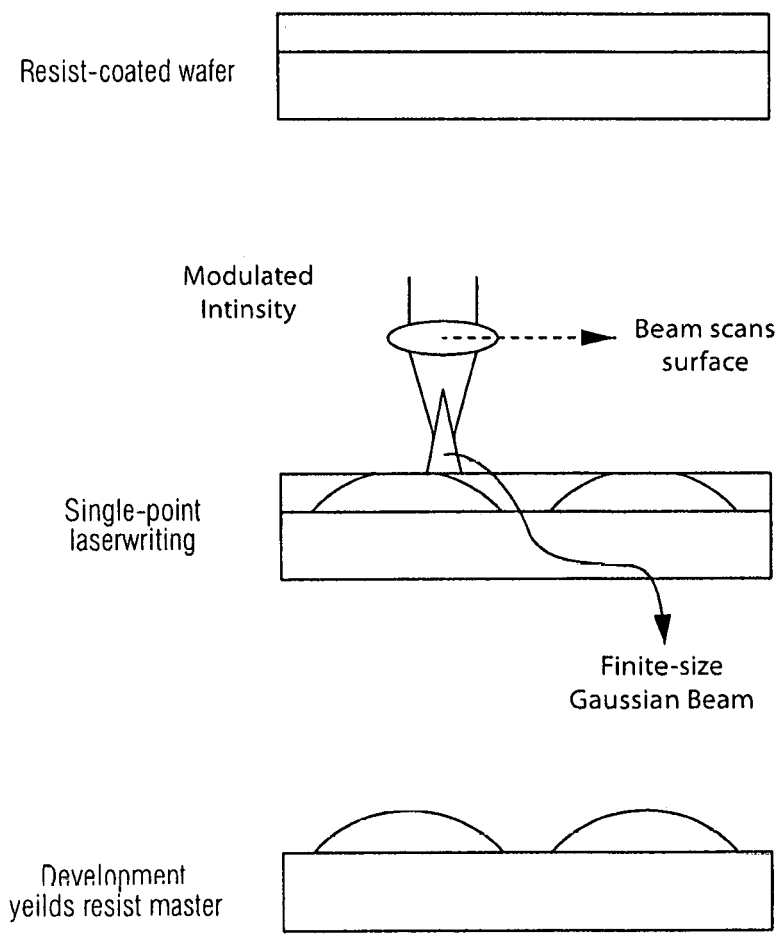
FIG. 11 is a schematic diagram illustrating an example fabrication processes for a RBM that may be used in various embodiments of this invention.

FIG. 11 shows the fabrication process of an RBM, in accordance with one embodiment of the present disclosure in the above respects, including the formation of microlenses on a wafer support. The RBM may be embedded in high RI material to reduce Fresnel depolarization, in order to improve image contrast of the MLD.

Figure 12:
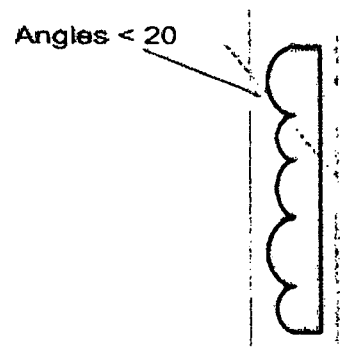
FIG. 12 illustrates a microlens according to an example embodiment of this invention.
Figure 13:
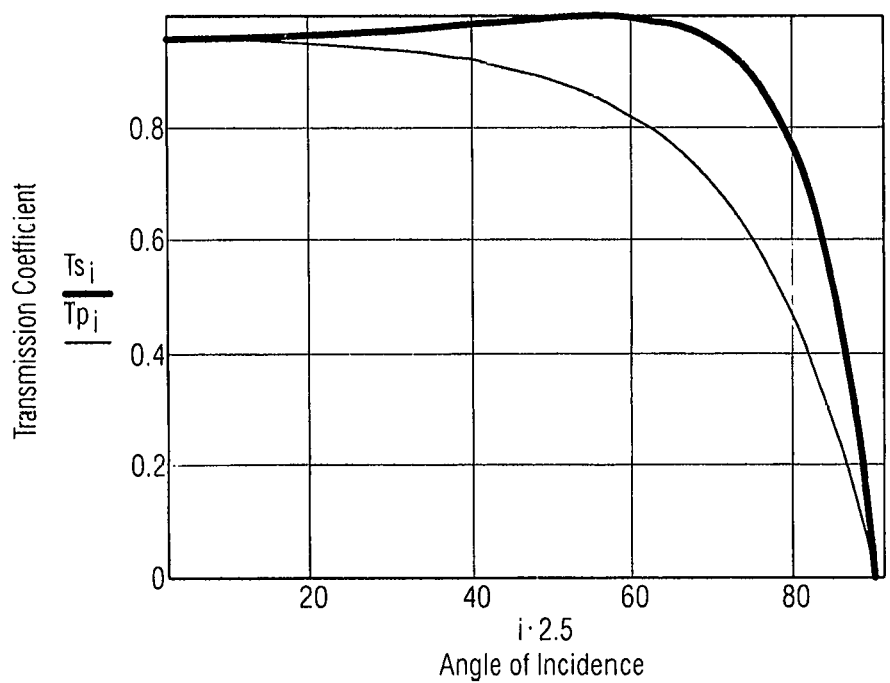
FIG. 13 is an angle of incidence vs. transmission coefficient graph that shows curves illustrating the transmission coefficient for S and P waves vs. angle of incidence.
Figure 14:
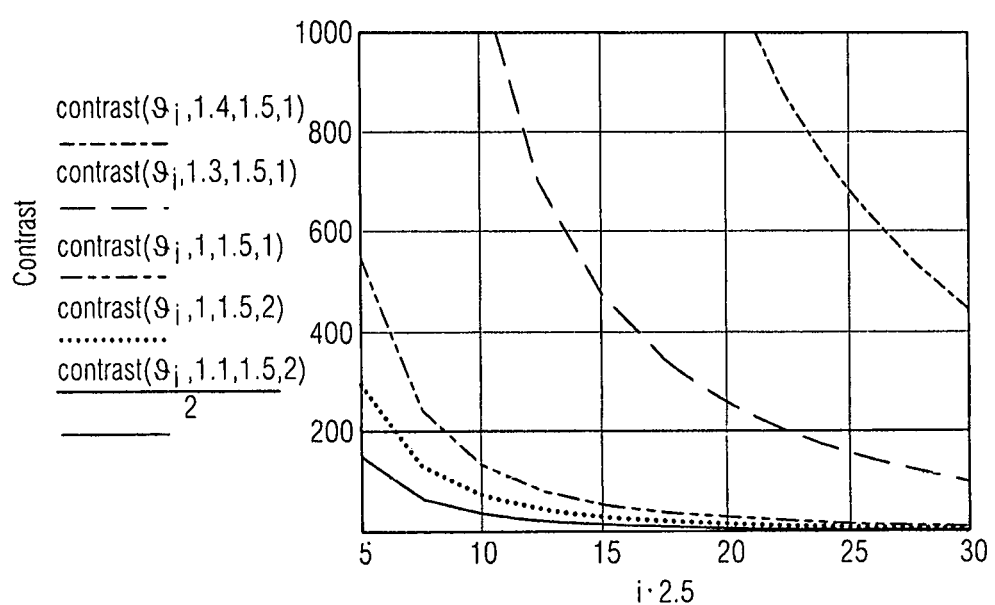
FIG. 14 is a graph showing system contrast (contrast(θi, n1, n2, N), wherein θi is the angle of incidence, n1 is the refractive index of the material between LCDs, n2 is the refractive index of glass, and N is the number of interfaces.

FIG. 12 shows a microlens surface, which typically has a distribution of surface normals between 0 and approximately 20 degrees. The distribution of surface normals leads to contrast reduction because S and P polarizations are transmitted with different attenuations. FIG. 13 shows curves illustrating the transmission coefficient for S and P waves vs. angle of incidence, and FIG. 14 shows system contrast (contrast($\theta i$, n1, n2, N), wherein $\theta i$ is the angle of incidence, n1 is the refractive index of the material between LCDs, n2 is the refractive index of glass, and N is the number of interfaces. As shown the line to the far right with the RI at 1.4 and 1.5 shows the best contrast as the Fresnel depolarization is the least.

Figure 15:
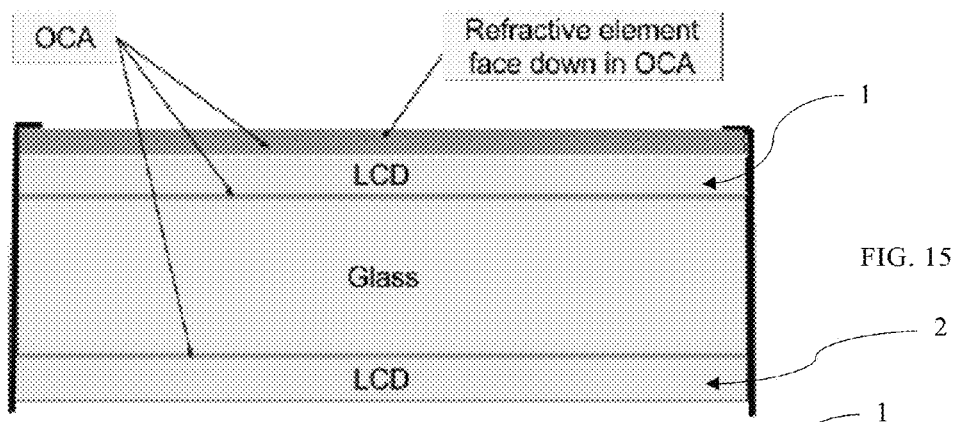
FIGS. 15-17 are side cross sectional views of a MLD system according to embodiments of this invention where a moire reducing element (e.g., RBM) is placed in various locations of a stack in a MLD system according to various embodiments of this invention (this may or may not be used in combination with sub-pixel compression in various embodiments of this invention)
Figure 16:
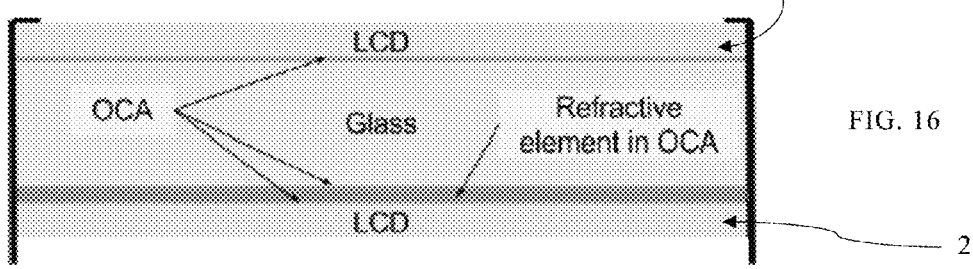
Figure 17:
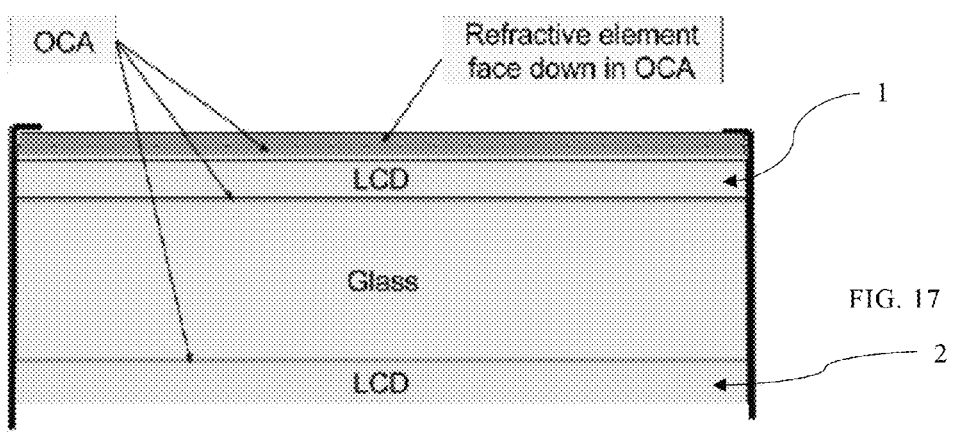

FIGS. 15-17 show various placements of the moiré reduction element (e.g., refractive element such as RBM). In FIGS. 15 and 17 for example, the moiré reduction element could be positioned on the top surface of the front display 1 as a laminatable film with the patterned surface facing downwards to get the feature size small, as previously described. These embodiments may or may not be used in combination with subpixel compression techniques described herein. In one embodiment, having the patterned surface facing upwards would also act as an anti-glaring mechanism, but it will be necessary to embed in optical coupling adhesive (OCA) with a refractive index of approximately 1.5 to achieve a feature size smaller than 70 μm. Alternatively, as shown in FIG. 16, it is also possible to place the moiré reduction element between two LCDs where the divergence will be larger, and thus the feature size smaller. Again, the FIG. 16 placement of an RBM may or may not be used in combination with subpixel compression techniques discussed herein. Index matching the internal voids with a material of R.I. greater than 1.4 (see OCA) will greatly reduce Fresnel depolarization, thereby improving contrast and reducing reflections. The internal voids index matched with glass and OCA to reduce Fresnel polarization also improve contrast and reduce reflections. In one embodiment, the FWHM width for this implementation may be about 1.8 degrees, with a square profile.

Figure 7:
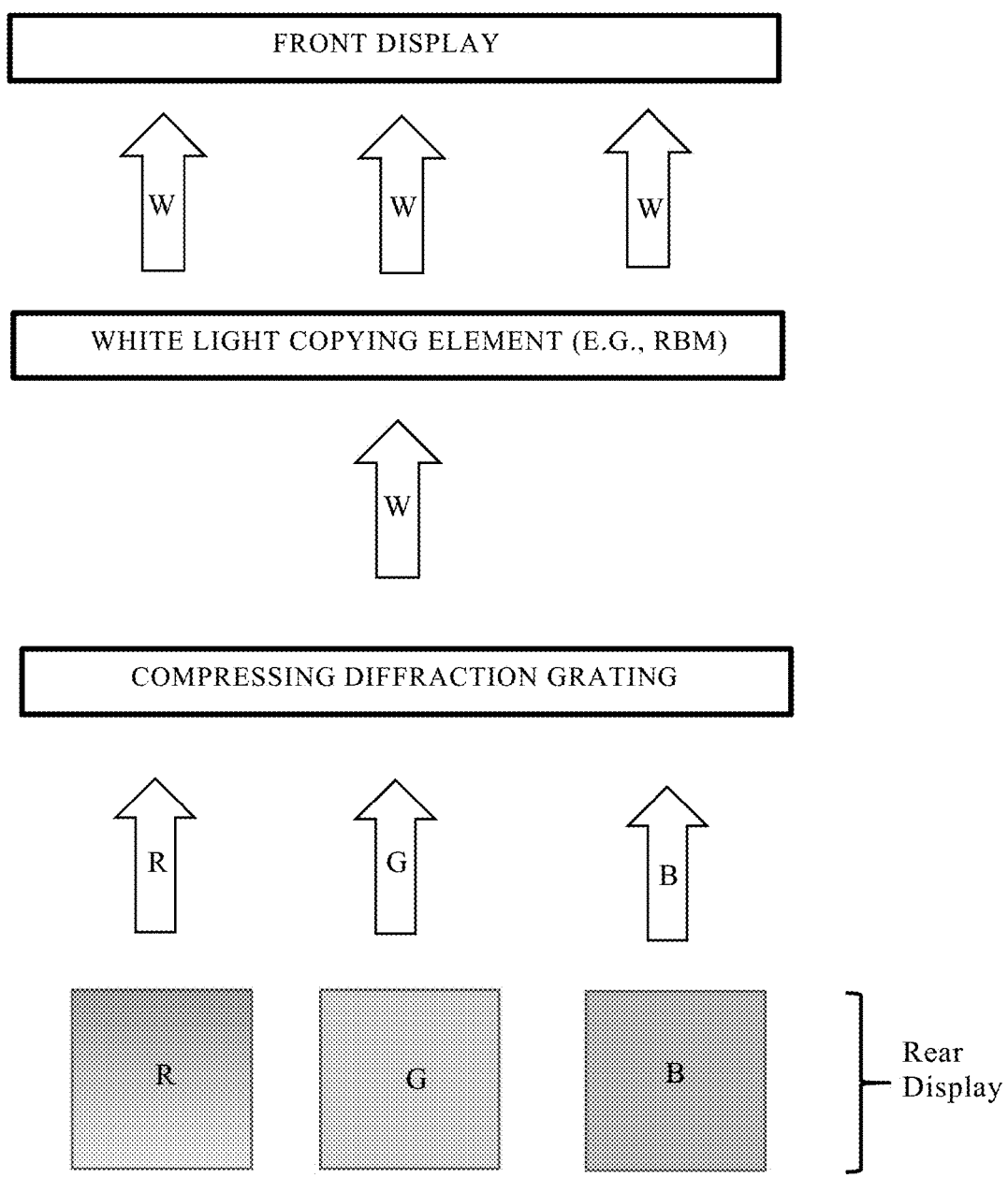
FIG. 7 is a schematic diagram of sub-pixel compression that may be used to reduce moire interference in a MLD system according to an embodiment of this invention (this may or may not be used in combination with other techniques for reducing moire interference discussed herein, in various embodiments of this invention)

FIG. 7 illustrates a subpixel compression embodiment, as discussed above. Modern imaging systems employ discrete, regularly arranged pixels which often interact with other regularly arranged features either within the system itself or in the environment at large. For example the color filters on cameras can interfere with features in the environment to produce moiré interference in the final image. Such features in the environment can be display systems, stripes on clothing, corrugations on roofs, mesh chairs, lace etc. Even if the stripes are monochrome the resulting interference can be colored in appearance. A particularly strong version of this interference is found in multilayered displays where the color filters on the two stacked display layers can interact to give bright and dark bands as discussed above. There are several schemes discussed herein to get rid of this interference, including subpixel compression and the refractive element techniques discussed above.

Consider a technique using some sort of low pass filtering to make the sensor array response, or the display system, more uniform. This often comes at a cost to the image quality. Consider an example taken from a display. In this case one desires effectively removing or hiding all of the black mask and sub-pixel structure from the system, while trying to retain the contrast of the central pixel. However, contrast is often degraded in this case. This is because no matter how perfectly the square grating approximates a top hat, there is still often some leakage between the color filters and the desired central black pixel. For example consider the blue filter arrangement in FIGS. 1-2 and 18: if there are 3 copies made—one in the middle, one to the left and one to the right, the rightmost copy intrudes into the black region in FIG. 18. This reduces the contrast of the central black pixel. To get a result that retains full pixel contrast what is often desired is a way to copy each colored sub-pixel so that it stays within the bounds of its own pixel. To do this, a physical method such a subpixel compression techniques discussed herein may be used for remapping the sub-pixels based on their color into a combined stripe. In one embodiment, it is possible to use the method of sub☐pixel compression to construct a multilayer optical element that turns or compresses the red and blue sub-pixels onto the green sub-pixel. This changes the rear color filter pattern into a single white strip as shown in FIG. 7 for instance, which removes color filter interaction between display layers. The white stripe is then expanded/copied. In one embodiment, this can be achieved using a grating designed to separate colors. That is, light is split into colors through the use of color separation gratings. The diffraction based system relies on over☐phasing and can be fabricated using lithography techniques. White light that passes through the grating is split into three separate orders: red, green, and blue. In one embodiment, the use of color gratings may spread out the color array as shown in FIG. 7, however, a color splitter can be used to pre-tile the rays to drive them towards the green element, in one embodiment. For compressing, in an example embodiment, when the grating is applied to the display, these orders shift the position of the red sub-pixel to the middle, and the blue sub-pixel to the middle☐ i.e., over top of the green sub-pixel, as shown in FIG. 7. This results in a white stripe, which is configured for removing color information. The combined central stripe can then be copied to the left and the right using a standard square shaped refractive beam mapper as shown in FIG. 7 as the light proceeds toward the viewer so that desired images may be seen clearly.

Figure 18:
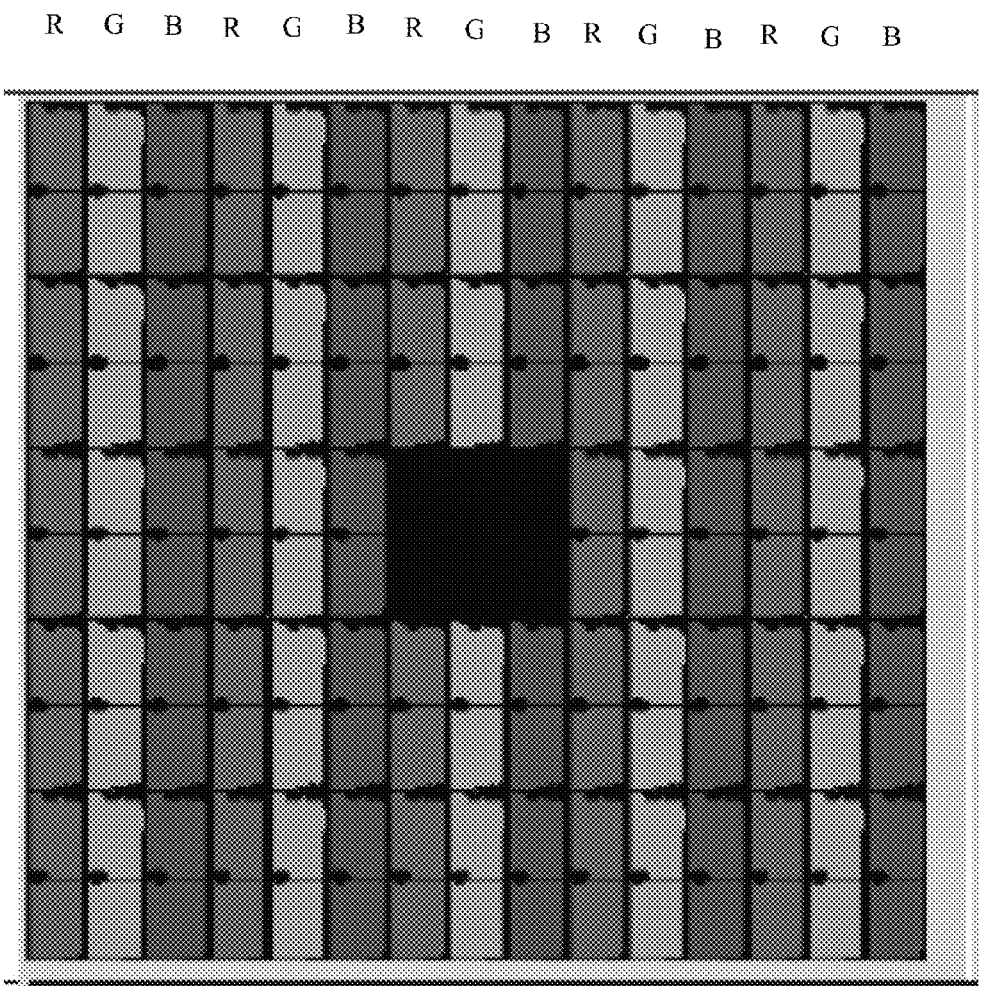
FIG. 18 is a top plan view of a rear display in a MLD system, the display including array of colored subpixels.

FIG. 18 shows an example pixel and sub-pixel structure before compression. A red-green-blue (R-G-B) striped pattern can be repeated. For instance, a vertical red stripe is shown at the left side of the pixel, followed by a vertical green stripe to the right, and a vertical blue stripe to the right. This R-G-B pattern is repeated, for each pixel, four more times, such that 5 sets of R-G-B striped patterns are shown in FIG. 18. In addition, a central black pixel area is shown in FIG. 18.

Figure 19:
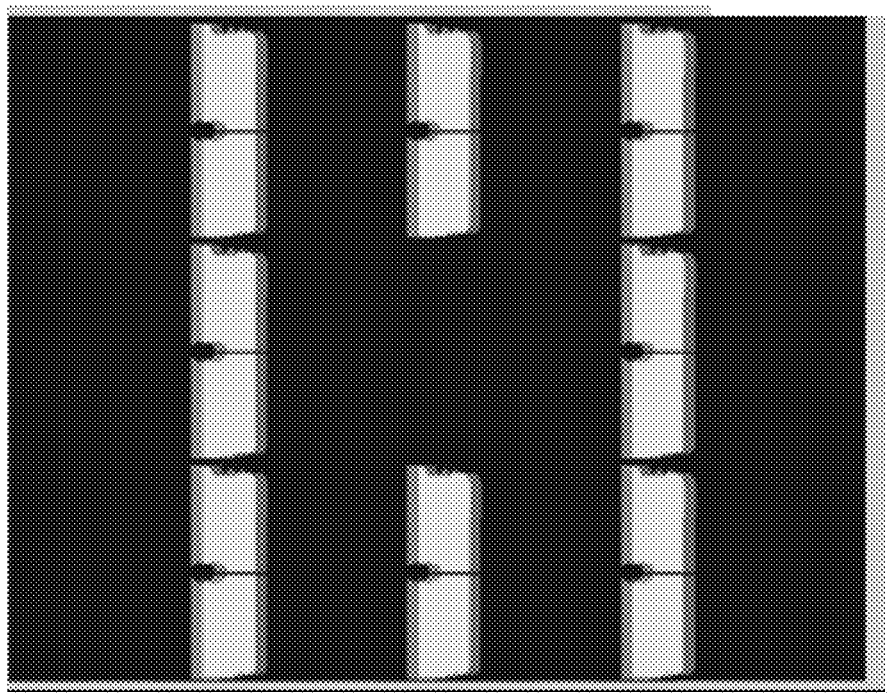
FIG. 19 is a top plan view illustrating a plurality of white stripes or strips after light from some of the respectively colored subpixels of the FIG. 18 rear display is compressed according to an example embodiment of this invention.
Figure 20:
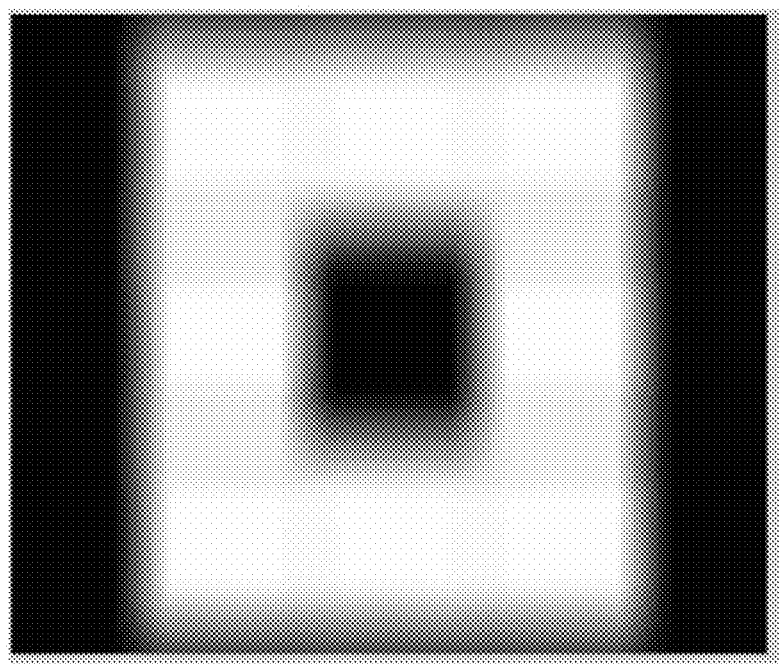
FIG. 20 is a top plan view illustrating light from FIG. 19 after the compressed light is copied or spread out as it proceeds toward the front display according to an example embodiment of this invention.

FIG. 19 illustrates the application of a color splitting kernel (e.g., prism or diffractive grating) that compresses each of the pixels into a central white stripe. See also FIG. 7. In other words, as shown in FIG. 7, the color splitting kernel, in each pixel, shifts the position of the red sub-pixel to the middle, and the blue sub-pixel to the middle☐i.e., over top of the green sub-pixel of that pixel, as shown in FIG. 7. This results in a white stripe for that pixel as shown in FIGS. 7 and 19, which is configured for substantially removing color information. The color stripe pattern has all but disappeared, as shown in FIG. 19. As shown in FIG. 19, three central white stripes are each shown in place of a corresponding green stripe, for at least three corresponding pixels. Note that, for purposes of simplicity, not all of the white stripes generated from FIG. 18 are shown in FIG. 19. FIG. 20 then illustrates how the stripe or stripes are spread out (e.g., copied or expanded), while still preserving the contrast ratio of the central, black pixel. This is accomplished by applying a square kernel such as an RBM to the stripes (e.g., see FIG. 7). For example, each combined central stripe (e.g., white) can then be copied to the left and the right using a standard square shaped refractive beam mapper, resulting in the spread white light shown in FIG. 20 with the central black pixel still being retained. This has the effect of reducing moire interference.

Thus, in certain example embodiments, there is a method for displaying images, includes: mapping colored light from a plurality of colored sub-pixels (e.g., R, G and B subpixels) based on their color to generate a single white stripe or white area for a given pixel; and then copying the white stripe or area to a left and a right of the single white stripe or area, for the pixel. See FIGS. 7 and 18-20. The color squeezing device that is applied may be a color separation diffraction grating. In one embodiment, the color array device may be a color filter array applied to an image sensor. In one embodiment, the color array device may be any device that emits light in regular color based patterns. For example such patterns may be red, green and blue stripes. In another example, such patterns may be red, green, blue and white stripes. In one embodiment, such patterns may be Bayer patterns or the like. In one embodiment, such spreading element may be a holographic diffuser, a refractive beam mapper, or a diffractive beam splitter. In one embodiment, the color squeezing devices may be positioned at an angle to the regular array to remove any local interactions. In one embodiment, the color squeezing device may be positioned at any distance from the regular array to provide the appropriate sub-pixel displacement. In one embodiment, the color squeezing device may designed to have displacement angles designed to provide appropriate sub pixel displacement. In one embodiment, the color squeezing devices may have a periodicity designed to minimize local interactions with the regular array.

Figure 21:
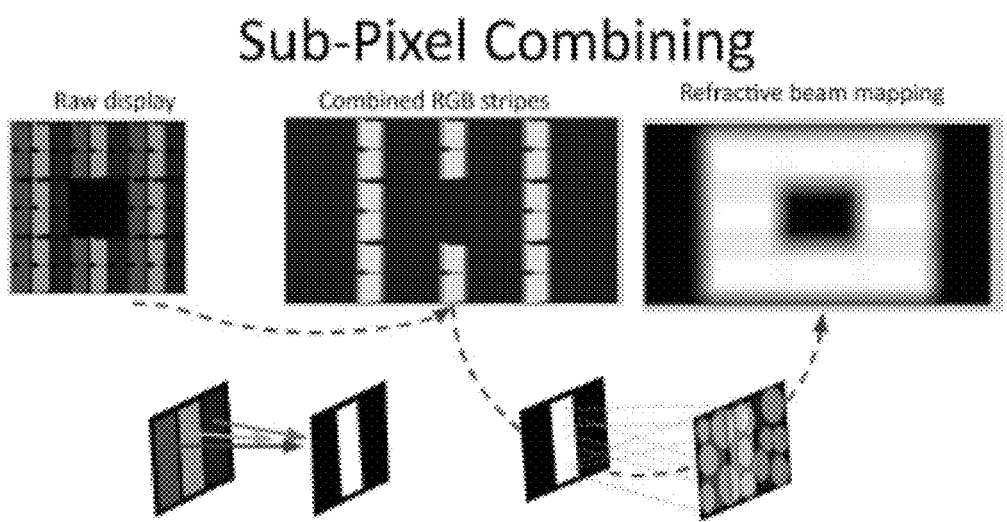
FIG. 21 is a schematic diagram illustrating subpixel compression in a MLD system according to an example embodiment of this invention.
Figure 22:
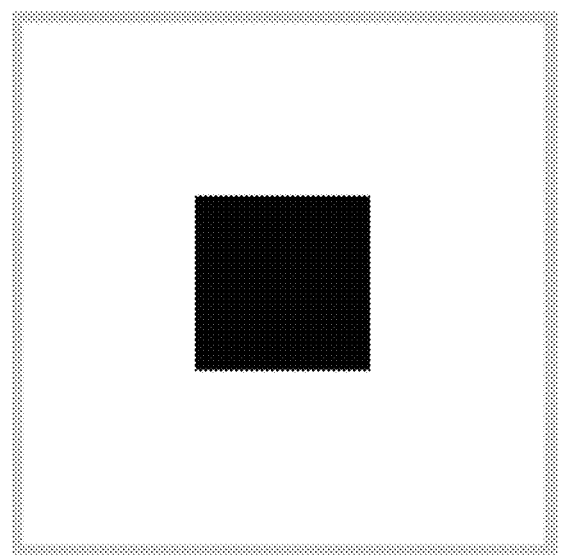
FIG. 22 is a top view illustrating desired pixel structure with full contrast.
Figure 23:
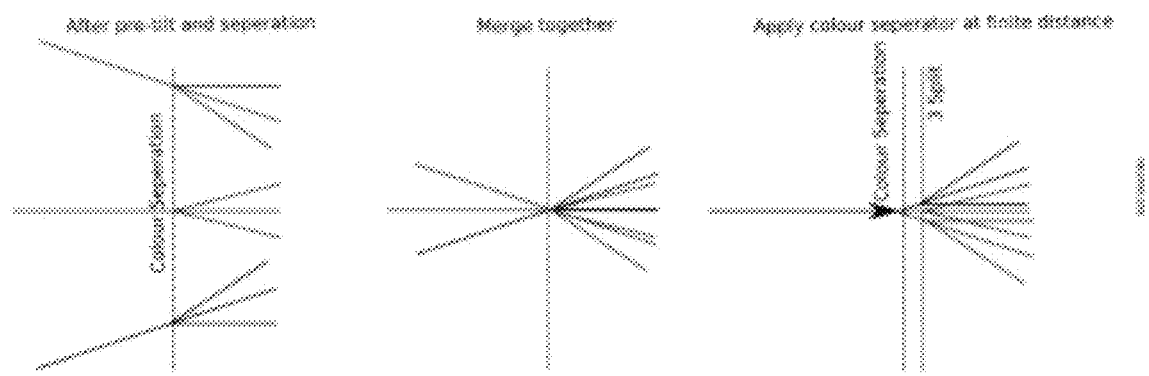
FIG. 23 is a schematic diagram illustrating subpixel color compression/squeezing, and then expansion, according to an example embodiment of this invention.
Figure 24:
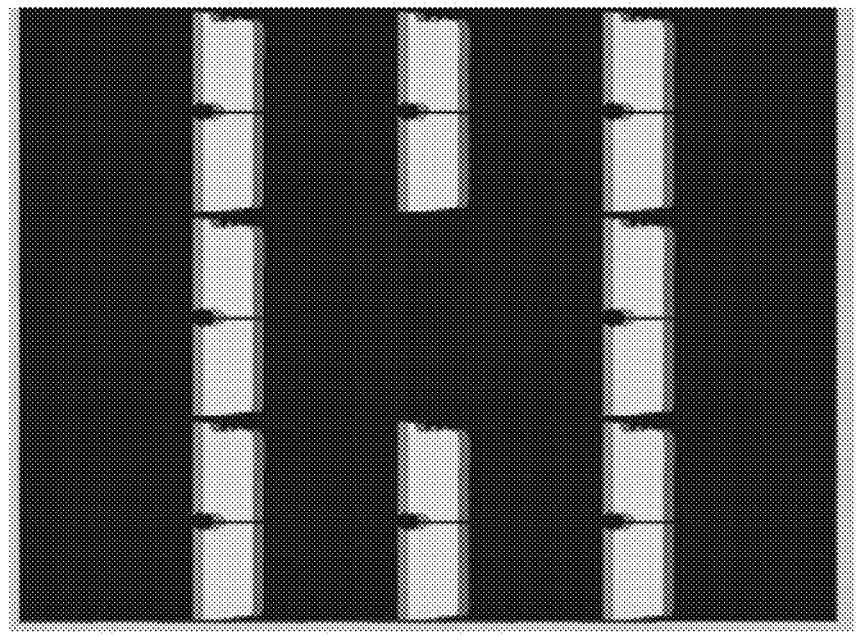
FIG. 24 is a top plan view illustrating a plurality of white stripes or strips after light from some of the respectively colored subpixels of FIG. 23 are compressed according to an example embodiment of this invention.
Figure 25:
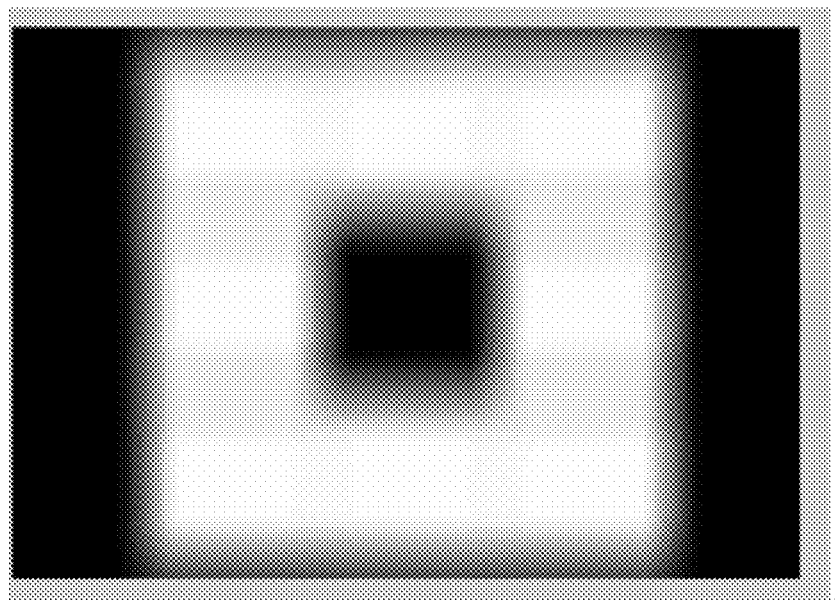
FIG. 25 is a top plan view illustrating light from FIG. 24 after the compressed light is copied or spread out as it proceeds toward the front display according to an example embodiment of this invention.

FIG. 21 illustrates an overview of a subpixel compressing technique, including squeezing the pixels into a central stripe, and then expanding out again to form a uniform display layer without intrusion into a central pixel. FIG. 22 shows a desired structure, where there is full contrast in the central black pixel, with no residual pixel structure outside of the mask. FIG. 18 shows the original pixel/sub-pixel structure before compression. As shown, there are three different structures to be substantially removed from view of the viewer: 1) the color mask; 2) the horizontal black matrix; and 3) the color filters. FIG. 23 shows, among other things, the color squeezing step. To retain image quality the rays are pre-tilted using a "splitting device" to drive the sub-pixel into the central stripe (i.e., red moves to the right, green stays central and blue moves to the left, shown on the left half of the dotted line), before splitting out into three columns. FIG. 24 shows on the image application, the color splitting kernel effectively compresses the pixels each into a central stripe. The color stripe pattern has all but disappeared. The small color fringes on either side of the central white pixel in FIG. 24 are the result of the different diffraction displacements at different wavelengths, and are acceptable. FIG. 25 shows that the stripe can then be spread out, while preserving the contrast ratio of the central black pixel, by applying a square kernel such as an RBM to the stripes.

Figure 26:
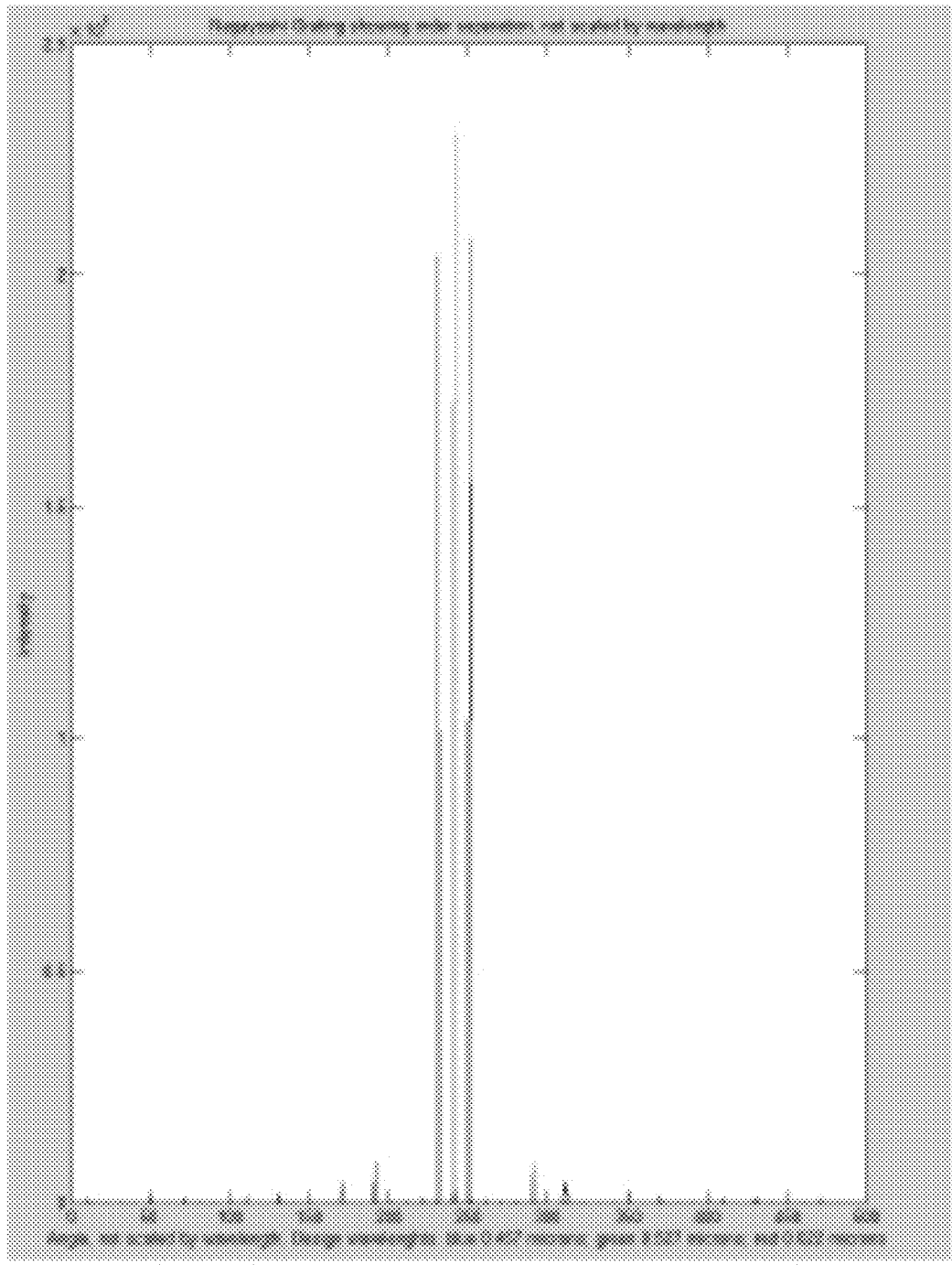
FIG. 26 illustrates characteristics of an example six layer diffractive gating that may be used in various subpixel compression embodiments of this invention.
Figure 27A:
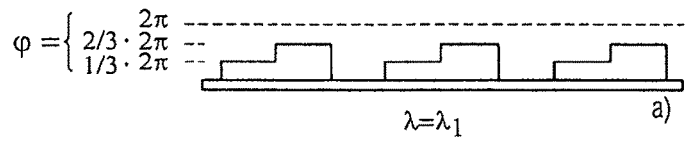
FIG. 27(a) is a side cross sectional view of a diffractive grating that directs blue light to the −1 order.
Figure 27B:
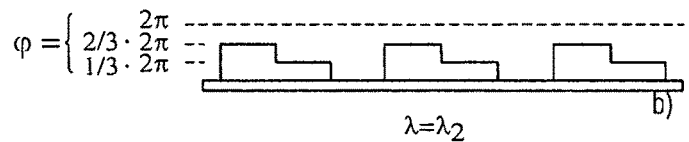
FIG. 27(b) is a side cross sectional view of a diffractive grating that directs red light to the −1 order.
Figure 27C:
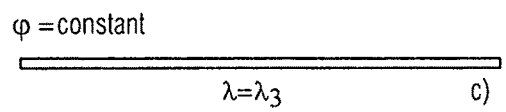
FIG. 27(c) is a side cross sectional view of a grating that directs green light into the 0 order.
Figure 28:
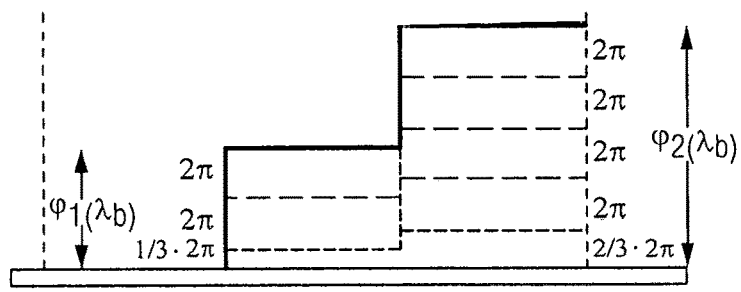
FIG. 28 is a side cross sectional view of an overphased grating combining gratings from FIG. 27.
Figure 29:
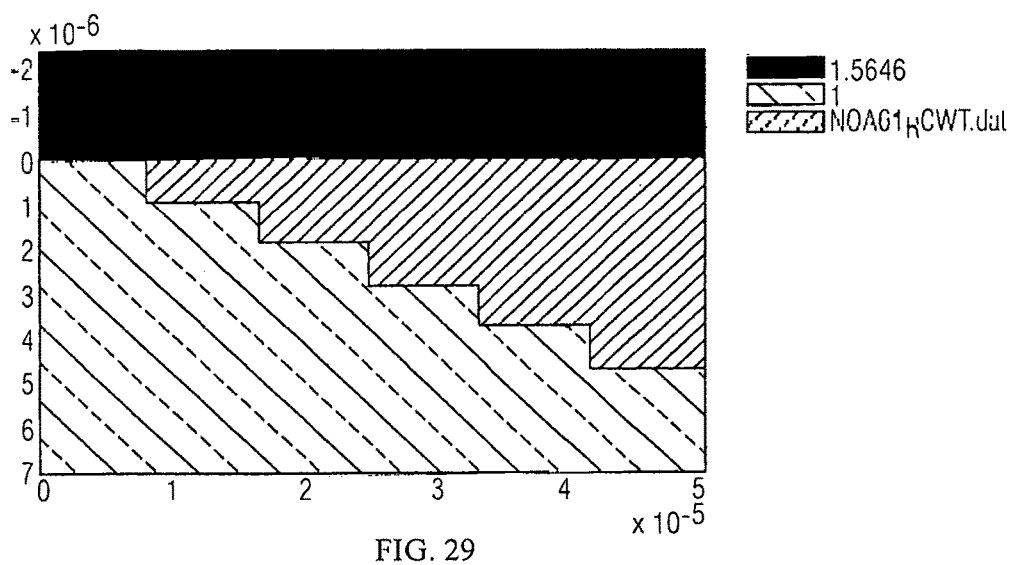
FIG. 29 is an image of a diffraction grating, simulated using RCWA, that may be used in subpixel compression embodiments of this invention.
Figure 30:
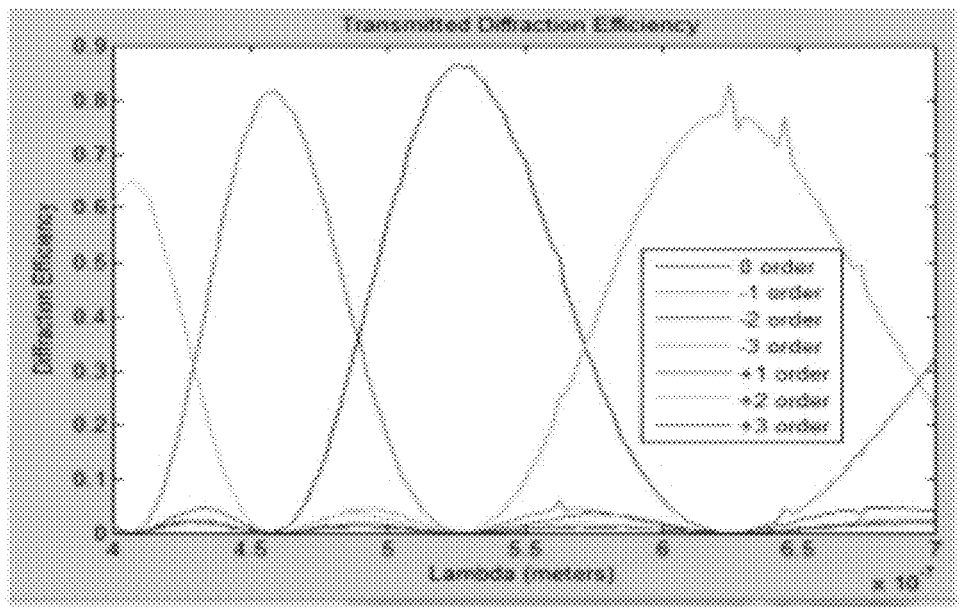
FIG. 30 is a diffraction efficiency vs. lamda (meters) graph illustrating analysis of the grating from FIG. 29.

For copying/spreading or compressing, color separation gratings using stepped gratings may be implemented. The system may rely on diffraction over-phasing, and can be fabricated using lithography techniques. White light that passes through the grating is split into here separate orders: red, green, and blue. However, when the grating is applied to the display, these orders shift the position of the red sub-pixel to the middle, and the blue sub-pixel to the middle, both over the top of the green sub-pixel, in order to effect compressing as discussed above. This results in a white stripe, thus removing color information. FIG. 26 shows characteristics of a six layer grating, in an example embodiment. Low levels of noise outside of the (−1, 0, +1) orders are noted. In other embodiments, three or four level gratings may be used, depending on LED or color wavelengths. FIGS. 27(a)-(c) show a multi-layer grating. In FIG. 27(a), there is shown a grating that directs blue light into the −1 order, while FIG. 27(b) shows a grating that directs red light into the +1 order. And FIG. 27(c) shows a structure that directs green light into the 0 order. FIG. 28 shows an over-phased grating that is a combination of the FIG. 27 structures. FIG. 29 shows an image of a diffraction grating to be simulated using RCWA. The legend denotes the refractive indices of the materials used in the simulation. FIG. 30 shows the results from an analysis of the grating of FIG. 29. As shown in FIG. 30, note the separation between wavelengths. The x axis is the wavelength in meters and the y axis denotes the transmitted diffraction efficiency for each of the respective orders. To achieve color separation, a light source (or color filters) is used with narrow spectrums centered on the mean of the Gaussian type shapes shown.

Figure 31:
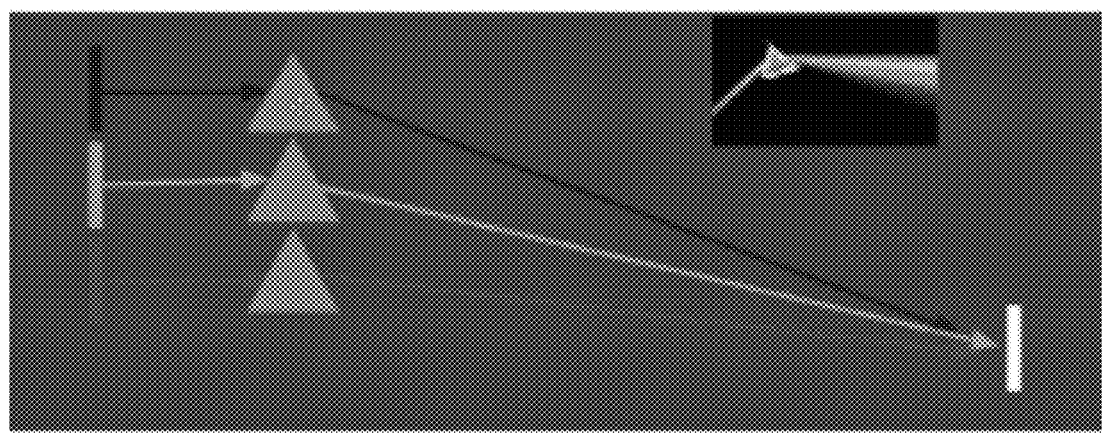
FIG. 31 is a schematic diagram illustrating that prisms may be used to steer colored beams, instead of or in addition to a diffractive grating, in alternative subpixel compression embodiments of this invention.

FIG. 31 shows that micro prisms may be used to steer beams in alternative embodiments for compressing for example. In one embodiment, the micro prisms are located in front of the display.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In certain example embodiments of this invention, there is provided a display device comprising: a first display in a first plane for displaying a first image; a second display in a second plane for displaying a second image, wherein said first and second planes are approximately parallel to each other; a subpixel compressing structure provided between the first and second displays for reducing moire interference, the subpixel compressing structure comprising a first optical element for compressing red light from a red subpixel, green light from a green subpixel, and blue light from a blue subpixel into a white area, and a second optical element for spreading the white area.

In the display device of the immediately preceding paragraph, the first optical element may shift a position of the red light to a position over the green subpixel and shift a position of the blue light to a position over the green subpixel, while substantially maintaining a position of green light from the green subpixel, to form the white area.

In the display device of any of the immediately preceding two paragraphs, the white area may be a white stripe.

In the display device of any of the immediately preceding three paragraphs, the first optical element may comprise a prism, a diffractive grating, and/or a refractive beam mapper.

In the display device of any of the immediately preceding four paragraphs, the second optical element may comprise a refractive beam mapper.

In the display device of any of the immediately preceding five paragraphs, the second optical element may comprise a plurality of microlenses.

In the display device of any of the immediately preceding six paragraphs, the first and second displays may have different color filter patterns, respectively, as viewed from a point of view of a viewer of the display device.

In the display device of any of the immediately preceding seven paragraphs, the first display may be a rear display of the display device, and wherein red, green and blue color filters in the first display may be oriented in substantially parallel lines in a first direction.

Embodiments according to the present disclosure are thus described. While the present disclosure has been described in particular embodiments, it should be appreciated that the disclosure should not be construed as limited by such embodiments.

The invention claimed is:

1. A display device comprising:
a first display in a first plane for displaying a first image;
a second display in a second plane for displaying a second image, wherein said first and second planes are approximately parallel to each other;
a subpixel compressing structure provided between the first and second displays for reducing moire interference, the subpixel compressing structure comprising a first optical element for compressing red light from a red subpixel, green light from a green subpixel, and blue light from a blue subpixel into a white area, and a second optical element for spreading the white area; and
wherein the first optical element comprises a prism and/or a refractive beam mapper, and the second optical element comprises a plurality of microlenses and/or a refractive beam mapper.

2. The display device of claim 1, wherein the first optical element shifts a position of the red light to a position over the green subpixel and shifts a position of the blue light to a position over the green subpixel, while substantially maintaining position of the green light from the green subpixel, to form the white area.

3. The display device of claim 1, wherein the white area is a white stripe.

4. The display device of claim 1, wherein the first optical element comprises a prism.

5. The display device of claim 1, wherein the first optical element comprises a refractive beam mapper.

6. The display device of claim 1, wherein the second optical element comprises a refractive beam mapper.

7. The display device of claim 1, wherein the second optical element comprises a plurality of microlenses.

8. The display device of claim 1, wherein the first and second displays have different color filter patterns, respectively, as viewed from a point of view of a viewer of the display device.

9. The display device of claim 1, wherein the first display is a rear display of the display device.

10. A method for displaying images via a display device comprising a rear display in a first plane for displaying a first image, and a front display in a second plane for displaying a second image, wherein said rear and front displays are configured in a system so that the first and second images overlap each other, the method comprising:
- squeezing light from a plurality of sub-pixels of the rear display based on their color to generate a single white stripe;
- prior to the front display, spreading and/or expanding the white stripe to a left and a right of said single white stripe using a bandwidth limited kernel; and
- limiting divergence of light from all subpixels of the rear display to less than one pixel distance on said front display.

11. The method of claim 10, wherein said plurality of sub-pixels comprises red, green, and blue sub-pixels.

12. The method of claim 10, wherein said squeezing comprises:
- shifting a position of light from a red sub-pixel over an adjacent green sub-pixel, and shifting a position of light from a blue sub-pixel over said adjacent green sub-pixel.

13. The method of claim 10, wherein said spreading and/or expanding is accomplished using a square shaped refractive beam mapper.

14. The method of claim 10, wherein said squeezing comprises mapping performed by a color separation grating.

15. The method of claim 10, wherein the bandwidth limited kernel is a square kernel.

16. The method of claim 10, wherein the bandwidth limited kernel is a circular kernel.

17. The method of claim 10, wherein the bandwidth limited kernel is a refractive beam mapper.

* * * * *